Patented Apr. 7, 1936

2,036,877

UNITED STATES PATENT OFFICE 2,036,877

INSULATING MATERIAL AND METHOD OF MAKING

Johannes Leppik, Nomme, Tallinn, Estonia, assignor to Telsit Insulation Corporation, New York, N. Y., a corporation of Delaware No Drawing. Application August 15, 1932, Serial No. 628,897. In Estonia August 17, 1931

2 Claims. (Cl. 106—18)

The present invention relates to a heat non-conducting material, to be used for the insulation of boilers, engines, steam pipes, refrigerating installations and the like. A great number of materials of this kind have already been recommended, but none of them come up to requirements. Such materials which actually possess high insulating qualities are exceedingly expensive, while those more or less accessible with regard to price, are heavy, combustible, insufficiently plastic, inelastic and not durable.

The proposed insulating material is very light, plastic as well as elastic, incombustible, scentless, and possesses sufficient durability as well as considerable viscosity, besides being very cheap. Below are given three formulæ for the insulating substance, which it is recommended to use in dependence of the way of insulation to be applied and the temperature of the partitions, if any, to be insulated:—

Formula I

|  | Voluminal parts |
|---|---|
| Plastic fatty clay | 0,8 to 1,3 |
| Milled paper | 1,2 to 2,2 |
| Saw-dust | 4,5 to 8,0 |
| Bast fibres | 1,5 to 2,5 |

As to bast fibres there may be applied flax refuse, hemp straw, hemp waste, jute waste and the like. The mixture obtained is to be well kneaded by adding water until it forms a kind of gruel. The insulating material prepared according to the above formula is especially recommended in cases where the temperature of the partitions to be insulated does not exceed 150° C.

Formula II

|  | Voluminal parts |
|---|---|
| Plastic fatty clay | 0,8 to 1,3 |
| Asbestos | 1,5 to 2,5 |
| Milled paper | 1,2 to 2,2 |
| Saw-dust | 4,5 to 8,0 |
| Bast fibres | 1,5 to 2,5 |

Water to be added to obtain a gruel-like substance

The material prepared from this formula can be very successfully used in insulating pipes, steam superheaters and the like, heated up to a temperature of 250° C. In case the partitions to be insulated are subjected to temperatures exceeding 250° C., it is recommended first to cover them with a comparatively thin layer of a mixture consisting of one part of asbestos and five parts of magnesia and thereupon with a layer of the insulating material prepared to Formula II.

To obtain an absolutely non-hygroscopic insulating material, the following formula is recommended:—

Formula III

|  | Voluminal parts |
|---|---|
| Plastic fatty clay | 1,0 to 1,5 |
| Milled paper | 2,0 to 3,0 |
| Cement | 2,5 to 3,5 |

Water to bring about a gruel-like mass

This coating is especially fit for covering of pipes located under ground or in the open air refrigerating installations and the like as well as a coating for insulation.

Having now particularly described and ascertained the nature of my said invention, and in what manner the same is to be performed, I declare that what I claim is:—

1. A material of the following composition and ratio by volume:

|  | Voluminal parts |
|---|---|
| Plastic fatty clay | 0.8 to 1.3 |
| Milled paper | 1.2 to 2.2 |
| Sawdust | 4.5 to 8.0 |
| Bast fibres | 1.5 to 2.5 |

2. A material of the following composition and ratio by volume:

|  | Voluminal parts |
|---|---|
| Plastic fatty clay | 0.8 to 1.3 |
| Asbestos | 1.5 to 2.5 |
| Milled paper | 1.2 to 2.2 |
| Sawdust | 4.5 to 8.0 |
| Bast fibres | 1.5 to 2.5 |

Water to be added to obtain gruel-like substance

JOHANNES LEPPIK.